April 8, 1941.　　　　A. H. NEULAND　　　　2,237,685

ASSEMBLED CRANKSHAFT

Filed April 29, 1940

INVENTOR.
Alfons H. Neuland

Patented Apr. 8, 1941

2,237,685

UNITED STATES PATENT OFFICE 2,237,685

ASSEMBLED CRANKSHAFT

Alfons H. Neuland, Cleveland, Ohio

Application April 29, 1940, Serial No. 332,212

6 Claims. (Cl. 74—597)

This invention relates to crankshafts and its object is to provide an assembled crankshaft of improved construction.

This invention is in part a continuation of my copending application Serial Number 181,086, filed December 22, 1937, for an Internal combustion engine which has been allowed on December 2, 1939 and issued on August 6, 1940, bearing No. 2,209,996, and in which I have described and shown subject matter which forms a part of the present application.

In displacement devices having angularly displaced cylinders and an open ended circumferentially unbroken crankcase, as in radial internal combustion engines, the cylinders are usually formed separately and secured to the crankcase by bolts after the pistons and connecting rods have been assembled with the crankshaft. One object of my invention is to permit the use of an engine block in which the cylinders are formed as an integral part of the crankcase, and in which the connecting rods may be connected first with the pistons and thereafter inserted into the crankcase thru open ended cylinders and assembled with the master rod before assembly of the crankshaft is completed.

The foregoing and other objects, features and advantages of my invention will appear in the following description and from the drawing showing a preferred embodiment and several species of my invention and will hereafter be more fully defined in the appended claims.

Figure 1:
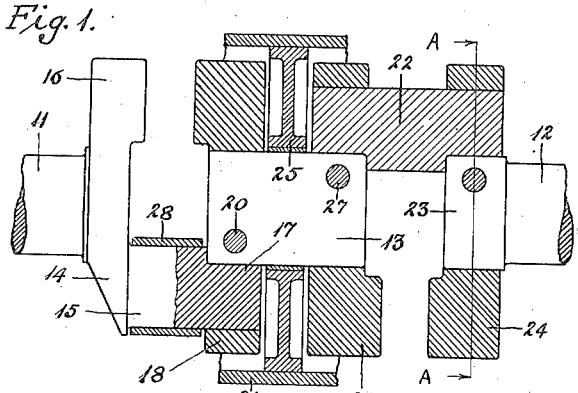
Fig. 1 is a side view, partly in section of one species of crankshaft.
Figure 2:
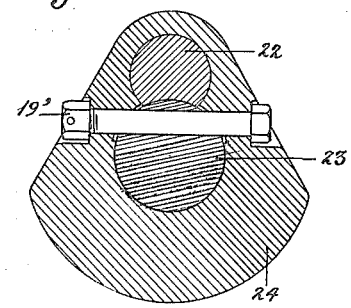
Fig. 2 is a cross section of the shaft in Fig. 1, taken on the line A, A.

Referring to the species shown in Figs. 1 and 2, the shaft includes outer main journal portions 11, 12 and a central cylindrical main journal portion 13. The portion 13 consists of a journal and an extension or plug at each end extending beyond the bearing surface. The journal portion 11 preferably includes crank arm 14 and crankpins 15 and preferably also includes the counterweight 16 as an integral part of the crankarm. The crankpin 15 extends beyond the journal surface and the extension forms a crankpin plug 17 which overlaps the plug 13, and on its inner side is bored out concentric with the main journal and to the exact radius of the plug 13, to form an axially parallel arcuate groove which exactly fits the outer surface of the plug 13 and serves to align the outer and central main journals with each other. I provide a clamp housing or element 18 with a pair of overlapping openings having exactly the same spacing between their centers as the spacing between the centers of the main journal and crankpin and ground to exactly the same diameter as the journal plug 13 and crankpin plug 17 respectively. I further provide a nut 19 and a clamping element or bolt 20 which extends thru the clamp housing and main journal plug 13 and serves to clamp the crankpin and journal plugs firmly together. It will be seen that as the bolt is tightened, the central opening in the clamp is drawn together. This produces a high tension in the strap like portion part T of the clamp housing 18, and tends to wrap it around the crankpin plug 17 and to press the arcuate groove or concave mating surface of the plug 17 against the outer convex mating surface of the plug 13 with great force. Since both plugs are closely fitted within the clamp element, the sides of the clamp need be pulled together but slightly, just enough to develop the required tension in the strap like portion of the clamp, and in order to insure the production of tension I provide the clamp housing, facing the main journal plug with a clearance extending a suitable distance from the crankpin plug and from the bolt 20. It should be noted that even though the strap portion of the clamp housing is of relatively small section, it is under tension and highly stressed and thus effectively resists deflection of the shaft during operation. It should also be noted that alignment of the shaft is secured thru forces acting on the outerly surfaces of the plugs which operate to lock adjoining plug surfaces together and maintain alignment, and that the alignment is not affected or disturbed by any distortion of the clamp due to tension produced in the strap like portion. The clamp element 21 is exactly the same as the clamp element 18 and serves to lock the other end of the central journal plug 13 with one end of the crankpin 22, arranged on the diametrically opposite side of the shaft, which is also provided with an arcuate groove and forced against the outer plug surface by the clamp as heretofore described in connection with clamp element 18. The crankpin 22 may be formed as part of the main journal portion 12 as described in connection with the journal portion 11, or it may be formed separately, provided with an arcuate groove at its other end and joined with the plug like extension 23 at the end of journal portion 12 by means of still another and identical clamp element 24. With this arrangement the intermediate bearing bracket 25 may be formed in one piece and slipped within the closely fitted central bore of the open ended crankcase, shown by the fragment 26 in the drawing, and each end bearing bracket may also be formed in one piece and so as to form closures for the open ends of the crankcase in an obvious manner, not shown. It should be noted that with my construction and arrangement, the crankshaft can be assembled entirely thru the open ends of the crankcase and so as to permit the use of a crankcase and cylinders formed in one piece. This is accomplished by first inserting the central portion of the shaft assembly into the crankcase, comprising the journal plug 13, bracket 25, clamp elements 18, 21 and bolts 20, 27. Thereupon the pistons are joined with their respective connecting rods and inserted into the crankcase thru the outer open ends of the cylinders. In instances where the cylinders are arranged radially in a circle the rods are then joined with the master connecting rod after which the crankpin is slipped thru the circumferentially unbroken bearing 28 in the connecting rod and the clamp bolt securely tightened, locking the shaft portions firmly together and forcing the end main journal to align with the central main journal.

While the crankpins are shown to have an angular spacing of 180°, it will be understood that any angular spacing may be provided by a change in the circumferential position of the bolt hole in one end of the plug 13 with respect to that in the other end of the plug.

Figure 3:
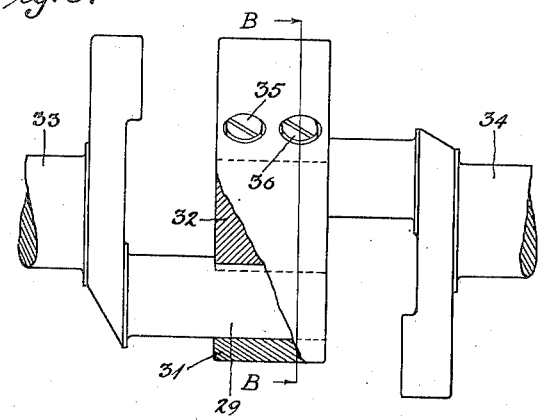
Fig. 3 is a side view, partly in section, of another embodiment of the species of shaft shown in Figures 1 and 2.
Figure 4:
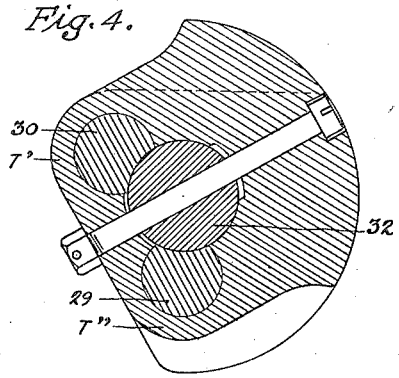
Fig. 4 is a cross section of the shaft in Fig. 3, taken on the line, B, B.

The shaft shown in Figures 3 and 4, is in part an embodiment of the species of shaft shown in Figures 1 and 2. In this embodiment the central main journal and bracket are eliminated and the crankpin extension plugs 29, 30 overlap and are locked together by means of a single central clamp housing 31. However I provide this shaft with a central auxiliary plug 32 and the clamp housing with a central opening for the plug 32 and further with a pair of bores, ground to fit the crankpin plugs and overlapping the central opening. These bores may be arranged on diametrically opposite sides of the central opening to provide opposed cranks as in Fig. 1, or they may have a different angular spacing such as shown in Figures 3 and 4. The crankpin plugs are provided with arcuate grooves, ground concentric with the main journals 33 and 34 to the exact radius of the auxiliary plug 32, and the bolts 35, 36, extending thru the auxiliary plug develop tension in the portion T' and T'' and force the mating or aligning surfaces firmly together, thereby aligning the main journal 33 with the main journal 34.

Figure 5:
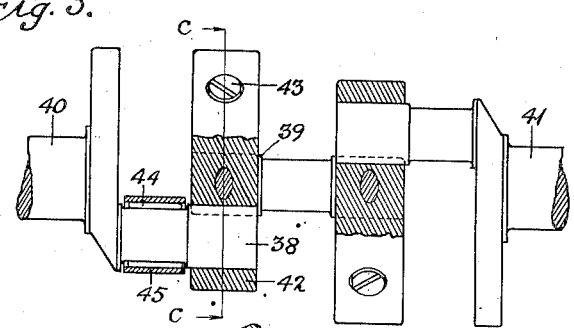
Fig. 5 is a side view, partly in section of another species of crankshaft.
Figure 6:
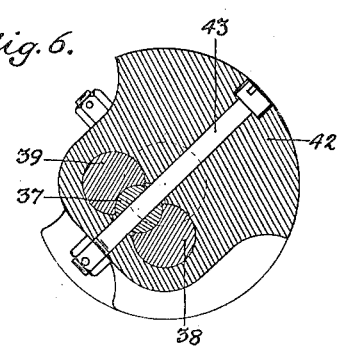
Fig. 6 is a cross section of the shaft shown in Fig. 5, taken on the line C, C.

The shaft shown in Figures 5 and 6 is adapted for use in engines which do not require an intermediate bearing between adjacent cranks but in which the crankpins have a relatively small angular spacing. In this instance I also provide an intermediate plug 37 between overlapping crankpin plugs 38, 39 but arrange the intermediate plug not in axial alignment with the main journals 40, 41, but radially distant from their center and in line with adjacent crankpin plugs 38, 39. The crankpin plugs have their arcuate grooves ground with a common center positioned at a distance from the shaft center to form mating surfaces which are firmly forced against the auxiliary plug by means of the clamp housing 42 and the clamping element bolt 43. The clamp housing is closely fitted over the crankpin plugs and is provided with a clearance facing the intermediate plug which extends between the crankpin plugs as shown in Figure 6. When it is desired to use anti-friction bearings such as the rollers 44 and race 45, the diameters of the plugs 38, 39 may be made to exceed that of the crankpins but so as to slip thru the bore of the race 45. This substantially increases the rigidity of the shaft but permits assembly as heretofore described. From Figures 5 and 6 it will be seen that the end cranks have an angular spacing of 180° but are both 90° displaced from the adjacent intermediate crankpin, one of the end cranks leading and the other trailing the center crankpin as the shaft rotates. This shaft is particularly suited for use in engines having a centrally arranged double acting induction cylinder associated with a pair of combustion cylinders. Such an arrangement is disclosed in my copending application Serial Number 331,572, filed April 25, 1940, for an Internal combustion engine.

Figure 7:
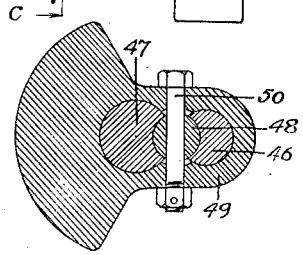
Fig. 7 is a cross section thru the clamp portion of another embodiment of the species of shaft shown in Figures 5 and 6.

Fig. 7 shows a modified form of the shaft shown in Figures 5 and 6. It is suited for applications in which the crankpin plug 46 is to be locked with a main journal plug 47. The plugs are separated by the intermediate auxiliary plug 48 and locked together by the clamp 49 and bolt 50 as heretofore described. It should be noted that the shafts shown in Figures 5, 6 and 7 lack the feature of inherent alignment which is secured by the arcuate groove in the crankpin plug ground concentric with the main shaft journal as described in connection with Figures 1 to 4. However the arrangement for locking adjacent plugs together with the aid of an auxiliary plug forces the shaft portions to assume a predetermined alignment, which may be secured by grinding the mating surfaces in their respective positions and to the proper diameters, locking the elements comprising the shaft together and finish grinding the main journal and crankpin bearing surfaces. When so processed the main journals, upon reassembly, will assume their predetermined alignment.

It should be noted that changes may be made in the details of construction and that the features disclosed herein may be used separately or may be combined to form other embodiments without departing from the spirit of my invention, and I desire to cover by my claims such changes and other embodiments which may be reasonably included within the scope of my invention.

I claim as my invention:

1. In a crankshaft a main journal having a plug extending beyond the journal surface provided with an axially parallel and concentric, with respect to said main journal, convex mating surface, a crankpin having a journal surface and a convexly cylindrical plug extending beyond the journal surface, means for aligning the axes of said journals in parallel relationship comprising an axially parallel, with respect to the crankpin journal, arcuate groove in said crankpin plug forming a concave mating surface associated with and having the same radius as said convex mating surface, and means for locking said plugs firmly together which includes a clamp housing surrounding said plugs and a clamping element associated with said housing extending transversely through the housing and through said main journal plug and adapted to force said mating surfaces firmly together.

2. In a crankshaft, a shaft portion having a main journal and a plug extending beyond the journal surface provided with an axially parallel and concentric, with respect to said main journal, convex mating surface, a second shaft portion including a main journal, a crankarm, a crankpin journal and a convexly cylindrical plug extending beyond said crankpin journal, means for aligning the axes of the main journals with each other comprising an axially parallel and concentric, with respect to its main journal, arcuate groove in said crankpin plug shaped to form a concave mating surface associated with and having the same radius as said convex mating surface, and means for locking said plugs firmly together which includes a clamp housing surrounding said plugs and a clamping element associated with and extending transversely thru said housing and adapted to force said mating surfaces firmly together.

3. In a two crank assembled shaft, a crankpin journal having a convexly cylindrical plug extending beyond the crankpin journal, a second crankpin journal also having a convexly cylindrical plug extending beyond the journal, means for aligning the axes of the crankpin journals in parallel relationship to each other comprising an auxiliary plug provided with a pair of concentric, with each other, convexly cylindrical mating surfaces, an axially parallel, with respect to its journal, arcuate groove in the first mentioned crankpin plug forming a concave mating surface associated with and having the same radius as one convexly cylindrical mating surface and an axially parallel, with respect to its journal, arcuate groove in the second mentioned crankpin plug forming a concave mating surface associated with and having the same radius as the other convexly cylindrical mating surface, and means for establishing a fixed angular spacing between the crankpins and for clamping adjoining plugs firmly together which includes a clamp housing arranged to surround said plugs and provided with a pair of angularly displaced bores for said crankpin plugs and with a clearance opposite said auxiliary plug extending between crankpin plugs, and a clamping element associated with and extending transversely thru said housing adapted to force associated mating surfaces firmly together.

4. In a two crank assembled shaft, a shaft portion including a main journal, a crankarm, a crankpin journal and a convexly cylindrical plug extending beyond the crankpin journal, a second shaft portion also including a main journal, a crankarm, a crankpin journal and a convexly cylindrical plug extending beyond the crankpin journal, means for aligning the axes of the main journals with each other comprising an axially parallel and concentric, with respect to its main journal, arcuate groove in the first mentioned crankpin plug forming a concave mating surface, an axially parallel and concentric, with respect to its main journal, arcuate groove in the second mentioned crankpin plug having the same radius as said first mentioned groove and forming a second concave mating surface and an auxiliary plug provided with a pair of concentric, with each other, convexly cylindrical mating surfaces associated with and having the same radius as said concave mating surfaces, and means for establishing a fixed angular spacing between the crankpins and for clamping adjoining plugs firmly together which includes a clamp housing arranged to surround said plugs and provided with a pair of angularly displaced bores for said crankpin plugs and with a clearance facing said auxiliary plug extending between crankpin plugs, and a clamping element associated with and extending transversely thru said housing adapted to force associated mating surfaces firmly together.

5. In a crankshaft, a pair of angularly displaced crankpins each provided with a journal surface and a plug extending beyond the journal surface the plugs being arranged circumferentially adjacent to one another, means for establishing a fixed angular displacement between crankpins and for aligning said crankpins in parallel relationship comprising an intermediate plug having oppositely positioned convexly cylindrical mating surfaces and an axially extending arcuate groove in each crankpin plug, each groove forming a concave mating surface associated with and matching a convex surface of said intermediate plug, and means for clamping adjoining plugs firmly together which includes a clamp housing arranged to surround said plugs and provided with a pair of closely fitting bores for said crankpin plugs and with a clearance facing said auxiliary plug extending between crankpin plugs, and a clamping element associated with and extending transversely through said housing adapted to force associated mating surfaces firmly together.

6. In a crankshaft, a shaft portion having a main journal and a plug extending beyond the journal surface, a crankpin journal having a plug extending beyond the journal surface and arranged radially adjacent to said main journal plug, means for establishing a fixed radial spacing between journals and for aligning said journals in parallel relationship comprising an intermediate plug having oppositely positioned convexly cylindrical mating surfaces and an axially extending arcuate groove in each crankpin plug, each groove forming a concave mating surface associated with and matching a convex surface of said intermediate plug, and means for clamping adjoining plugs firmly together which includes a clamp housing arranged to surround said plugs provided with a pair of closely fitting bores for said crankpin plugs and with a clearance facing said auxiliary plug extending between main and crankpin journal plugs, and clamping means associated with and extending transversely through said housing adapted to form associated mating surfaces firmly together.

ALFONS H. NEULAND.